US007407683B2

(12) United States Patent
Jones

(10) Patent No.: US 7,407,683 B2
(45) Date of Patent: *Aug. 5, 2008

(54) METHOD OF PREPARING A CONFECTIONERY PRODUCT MADE OF PROTEIN AND CARBOHYDRATE MATERIALS PRESENT IN A RELATIVE WEIGHT RATIO HIGHER THAN 1

(75) Inventor: Dennis Jones, Shelburne, VT (US)

(73) Assignee: Nellson Nutraceutical, llc, Irwindale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,203

(22) Filed: Aug. 9, 2005

(65) Prior Publication Data
US 2006/0035010 A1 Feb. 16, 2006

Related U.S. Application Data

(60) Continuation of application No. 10/647,466, filed on Aug. 26, 2003, now abandoned, which is a division of application No. 10/117,111, filed on Apr. 8, 2002, now Pat. No. 6,749,886, which is a continuation of application No. 09/920,802, filed on Aug. 3, 2001, now Pat. No. 6,432,457, which is a division of application No. 09/639,851, filed on Aug. 16, 2000, now Pat. No. 6,299,929, which is a continuation of application No. 08/246,369, filed on May 19, 1994, now abandoned, which is a continuation of application No. 07/891,929, filed on Jun. 1, 1992, now abandoned, which is a continuation of application No. 07/641,131, filed on Jan. 15, 1991, now abandoned.

(51) Int. Cl.
A23J 1/00 (2006.01)
A23J 1/14 (2006.01)
A23J 1/08 (2006.01)
A23J 1/20 (2006.01)
A23J 1/12 (2006.01)

(52) U.S. Cl. .................. 426/660; 426/656; 426/658; 426/810; 426/103; 426/657

(58) Field of Classification Search .................. 426/2, 426/656, 660, 658, 810, 800, 801, 103, 661, 426/657
See application file for complete search history.

(56) References Cited

U.S. PATENT DOCUMENTS 3,185,574 A * 5/1965 Gabby et al. ................ 426/549
3,814,819 A 6/1974 Morgan
3,976,800 A * 8/1976 Deininger et al. ........... 426/311
4,152,462 A 5/1979 Hayward et al.
4,303,691 A * 12/1981 Sand et al. .................. 426/573
4,415,596 A 11/1983 Andersen et al.
4,832,971 A 5/1989 Michnowski
4,900,566 A * 2/1990 Howard ........................ 426/72
5,389,395 A * 2/1995 Joseph et al. ................. 426/72
6,299,929 B1 * 10/2001 Jones ......................... 426/656
6,432,457 B1 8/2002 Jones
6,749,886 B2 * 6/2004 Jones ......................... 426/656

FOREIGN PATENT DOCUMENTS

| BE | 0754215 | 12/1970 |
| DE | 2853194 | 6/1980 |
| GB | 2085273 | 4/1982 |
| GB | 2186177 | * 3/2008 |

OTHER PUBLICATIONS

Defendant Elan Nutriton Inc.'s Brief in Support of its Motion for leave to Amend Answer (Case NO. 2:02-cv-0304 WKS U.S. District Court for the District of Vermont) (With Exhibits listed below), no date provided.
Second Amended Answer to Complaint (Exhibit A to B1), no date provided.
Draft of Second Amended Answer to Complaint (Exhibit B to B1), no date provided.
Amendment and Request for Reconsideration under 37 C.F.R. 1.111 for U.S. Appl. No. 07/641,131, filed Nov. 12, 1991 (Exhibit C to B1).
Proposed Amendment and Request for Reconsideration under 37 C.F.R. 1.116 for U.S. Appl. No. 07/641,131, filed Jan. 15, 1991 (Exhibit D to B1).
Request for Reconsideration under 37 C.F.R. 1.111 for U.S. Appl. No. 07/641,131 (Exhibit E to B1), no date provided.
Amendment and Request for Reconsideration under 37 C.F.R. 1.116 for U.S. Appl. No. 07/891,929, filed Jun. 1, 1992 (Exhibit F to B1).
SUPRO 710 Isolated Soy Protein Product Description (Exhibit I to B1), no date provided.
SUPRO 670 Isolated Soy Protein Product Description (Exhibit J to B1), no date provided.
Recommended Applications for Purina Proteins (Exhibit K to B1), no date provided.
Expert Report of Ann H. Grev Civil No. 6:02-CV-304 (Exhibit L to B1), no date provided.
Brief on Appeal for U.S. Appl. No. 08/246,369 filed May 19, 1994 (Exhibit M to B1).
Amendment and Request for Reconsideration under 37 C.F.R. 1.111 for U.S. Appl. No. 07/891,929, filed Jun. 1, 1992 (Exhibit N to B1).
Amendment and Request for Reconsideration under 37 C.F.R. 1.111 for U.S. Appl. No. 08/246,369, filed May 19, 1994 (Exhibit O to B1).
Examiner's Action for U.S. Appl. No. 07/891,929 (Exhibit P to B1), no date provided.

(Continued)

Primary Examiner—Anthony Weier
(74) Attorney, Agent, or Firm—Arent Fox LLP

(57) ABSTRACT

The invention provides a method of making confectionery bar comprising a proteinaceous material and a carbohydrate material in a relative weight ratio higher than 1 (from 1:0 to about 1:0.999). The bar produced is very palatable and chewy and has good organolepetic properties. It may be coated (enrobed) or not as desired. The product of the invention provides a meal replacement for very low calorie diets, diet supplement or protein supplement, and may optionally comprise a carbohydrate material of low digestibility or indigestible nature.

4 Claims, No Drawings

OTHER PUBLICATIONS

Examiner's Action for U.S. Appl. No. 08/246,369 (Exhibit Q to B1), no date provided.

Letter to Gravel and Shea RE: *Bariatrix Products* vs. *Elan Nutrition, LLC.* Civil Docket No. 02-CV-304 (Exhibit S to B1), no date provided.

Fee Transmittal Form/Information Disclosure Statement/Preliminary Amendment/Amendment Accompanied by rely under 37 C.F.R. 1.114 for U.S. Appl. No. 10/117,111, filed Apr. 8, 2002 (Exhibit T to B1), no date provided.

Proprietary Information Disclosure Statement under 37 C.F.R. 1.56 and MPEP 724 for U.S. Appl. No. 10/117,111 (Exhibit U to B1), no date provided.

Expert Report of Wayne R. Moore, Ph.D.,Jan. 16, 2004 (for Defendant) (with Exhibits A-R, listed separately below).

Curriculum Vitae of Wayne R. Moore, Ph.D. (Exhibit A to document B23), no date provided.

The prosecution history of the 929 patent; (Exhibit D to B23), no date provided.

Calculations by Wayne R. Moore, Ph.D., regarding the caloric content of bars produced by the 929 and 800 patent; (Exhibit E to B23), no date provided.

The Protein Technologies product literature regarding various soy protein isolates, including PP 610, Supro 660, Supro 670, Supro 710, and the Farbest brand whey protein literature; (Exhibit F to B23), no date provided.

The project outline/report regarding the preparation and evaluation of milk protein concentrate powder as described in Example 1 of the 800 patent; (Exhibit G to B23), no date provided.

A spread sheet Wayne R. Moore, Ph.D., used to back calculate from the target product to the various stages in the process to starting fluid skimmed milk; (Exhibit H to B23), no date provided.

Summary spreadsheet of analytical results of protein powders using 5% protein by Farinograph method; (Exhibit I to B23), no date provided.

Revised water absorption test results for milk protein concentrate at PH 5 and natural milk protein concentrate produced according to Example 1 tested by the Farinograph method at 10% protein; (Exhibit J to B23), no date provided.

Calculations of Wayne R. Moore, Ph.D., of protein ratios for finished products based on Examples 3,4, and 12 of the 800 patent; (Exhibit K to B23), no date provided.

Initial calculations by Wayne R. Moore, Ph.D., regarding the caloric content of bars produced by the 929 and 800 patents; (Exhibit L to B23), no date provided.

Product specification sheets for ingredients used in testing; (Exhibit O to B23), no date provided.

Ultrafiltration Run Sheets from Protein Production; (Exhibit P to B28), no date provided.

Photographs of Extruded bars produced based upon the 800 patent and; (Exhibit Q to B23), no date provided.

List of Equipment and model numbers used to produce bars based upon the 800 patent (Exhibit R to B23), no date provided.

Expert Witness Report of Wayne R. Moore, Ph.D., Oct. 6, 2006 (with Exhibits 1-12 listed separately).

Protein Functionality in Food Systems; Gregory R. Ziegler; (Exhibit 2 to B41), no date provided.

Correlation of Water Absorption Methods: Water Holding Capacity and Farinograph Water Absorption (Exhibit 3 to B41), no date provided.

Hydrogen-Ion Activity (pH)-Electrometric Method; AACC Method 02-52; Nov. 3, 1999 (Exhibit 4 to B41).

Dough pH Measurements; (Exhibit 5 to B41), no date provided.

Soy Protein and Human Nutrition; Wilcke, et al; 1978; (Exhibit 6 to B41).

Food Chemistry; Owen R. Fennema; (Exhibit 6 to B41), no date provided.

Water Holding Capacity of Protein Products and Protein Product Blends; (Exhibit 7 to B41), no date provided.

Water Hydration Capacity: Calculated vs. Measured; (Exhibit 8 to B41), no date provided.

Vital Statistics; Michael Orkin et al.; (Exhibit 9 to B41), no date provided.

Food Protein Chemistry; Joe M. Regenstein et al.; (Exhibit 10 to B41), no date provided.

Ziegler Aug. 28, 2006 Expert Report; "Protein Blends Tested for Water Hydration Capacity"; (Exhibit 11 to B41).

Protein Content-Measured vs. Predicted; (Exhibit 12 to B41), no date provided.

Expert Witness Report of Wayne R. Moore, Ph.D., Aug. 25, 2006 (With 1-46 listed Separately below).

Curriculum Vitae of Wayne R. Moore, Ph.D., (Exhibit 1 of B55), no date provided.

The prosecution history of the 929 patent; (Exhibit 4 of B55), no date provided.

The prosecution history of the 866 patent (Exhibit 5 of B55), no date provided.

Calculations of Wayne R. Moore, Ph.D., regarding the caloric content of bars produced by the patents-in-suit; (Exhibit 6 of B55), no date provided.

Owen R. Fennema, Food Chemistry, Marcel Dekker, New York, 1985; (Exhibit 7 of B55).

C.W. Hutton & A.M. Campbell, ACS Symposium Series—Protein Functionality in Foods (M.Joan Comstock, ed.), American Chemical Society, 1981, pp. 177-200; (Exhibit 8 of B55).

AACC Method 56-30; "Water Hydration Capacity of Protein Materials"; (Exhibit 9 of B55), no date provided.

AACC Method 54-21, "Farinographic Method for Flour" (Exhibit 10 of B55), no date provided.

AACC Wheat Flour Check Sample, Series HS, found at www.aac-cnet.org; (Exhibit 11 of B55), no date provided.

Results from Jul. 13, 2006 analysis of protein water absorption, conducted by CII Laboratory Services, Kansas City, Missouri; (Exhibit 12 of B55).

Memo to D. Jones from Woodstone Foods regarding functional properties of Woodstone Gold, dated Nov. 6, 1991; (Exhibit 13 to B55).

Aaron M. Altschul & Harold L. Wilcke, New Protein Foods, vol. 5, Seed Storage Proteins, Academic Press, New York, 1985, p. 270; (Exhibit 14 to B55).

Exclusive Supply Agreement between Elan and Muscle Tech, dated Jan. 24, 2003, ELAN 65753-65782; (Exhibit 15 to B55), no date provided.

Raymond C. Rowe et al. (eds.), Handbook of Pharmaceutical Excipients, Pharmaceutical Press, Grayslake, Illinois, 2003, pp. 257-259; (Exhibit 16 to B55), no date provided.

F.H. Steinke, D.H. Waggle & M.N. Volgarev, Protein Foods in Human Health: Nutrition, Preventions and Therapy, CRC Press, Boca Raton, 1992, pp. 156-158 (Exhibit 17 to B55), no date provided.

M.T. Gillies, Compressed Food Bars, Noyes Data Corp., Park Ridge, NJ 1974, p. 85 (Exhibit 18 to B55).

Protein Technologies International product literature for soy protein pp. 610; (Exhibit 19 to B55), no date provided.

Summary spreadsheet of analytical results of protein powders using 5% protein by farinograph method (Exhibit 20 to B55), no date provided.

Comparison of analytical results of water absorption of protein powders measures using farinograph method using 5% and 10% flour replacement; (Exhibit 21 to B55), no date provided.

Protein Technologies International product literature for soy protein pp. 710; (Exhibit 22 to B55), no date provided.

Ralston Purina Protein Division product literature for soy protein pp. 860; (Exhibit 23 to B55), no date provided.

Farbest Brands product literature for caseinates, including calcium caseinate FARBEST 200: (Exhibit 24 to B55), no date provided.

The project outline/report regarding the preparation and evaluation of milk protein concentrate powder as described in Example 1 of the 800 patent; (Exhibit 27 to B55), no date provided.

A spreadsheet Wayne R. Moore, Ph.D., used to back calculate from the target product to the various stages in the process to starting fluid skimmed milk; (Exhibit 28 to B55), no date provided.

Revised water absorption test results for milk protein concentrate at pH 5 and natural milk protein concentrate produced according to Example 1 tested by the farinograph method at 10% protein; (Exhibit 29 to B55), no date provided.

Emulsification Capacity of Selected Proteins; (Exhibit 30 to B55), no date provided.
Calculations of Wayne R. Moore, Ph.D., of protein ratios for finished products based on Examples 3, 4, and 12 of the 800 patent; (Exhibit 31 to B55), no date provided.
Calculations of Wayne R. Moore, Ph.D., regarding the caloric content of bars produced by the 929 and 800 patents; (Exhibit 32 to B55), no date provided.
Initial calculations of Wayne R. Moore, Ph.D., regarding the caloric content of bars produced by the 929 and 800 patents; (Exhibit 33 to B55), no date provided.
Ultrafiltration Run Sheets from 2004 Protein Production; (Exhibit 34 to B55), no date provided.
Product specification sheets for ingredients used in 2004 testing; (Exhibit 35 to B55), no date provided.
List of equipment and model numbers used to produce bars based upon the 800 patent: (Exhibit 36 to B55), no date provided.
Photographs of extruded bars produced in 2004 based upon the 800 patent (Exhibit 37 to B55), no date provided.
Milk Protein Concentrate Report dated Jun. 13-15, 2006; (Exhibit 38 to B55).
Project outline/report dated Jul. 12, 2006 regarding preparation of extruded bars based upon the 800 patent; (Exhibit 39 to B55).
Photographs of extruded bars produced in 2006 based upon the 800 patent; (Exhibit 40 to B55), no date provided.
Reported and calculated macro-components in Example 4 of the 574 patent; (Exhibit 43 to B55).
Revised Manufacturing Procedure, Bariatrix Protein Bars, dated Jan. 4, 1990, ELAN 26987-26991. (Exhibit 46 to B55).
Reply Expert Witness Report of Wayne R. Moore, Ph.D., (Jan. 23, 2007).
Expert Report of Ann. H. Grev, Aug. 24, 2006 (With Exhibits A-L, listed separately below).
Curriculum Vitae of Ann Grev (Exhibit A for B102), no date provided.
Amendment and Request for Reconsideration under 37 C.F.R. 1.111 filed Jan. 15, 1991 (Exhibit D for B103).
AACC Method 56-30; "Water Hydration Capacity of Protein Materials"; (Exhibit E for B103), no date provided.
PRO FAM "Isolated Soy Protein Products" (Exhibit F for B103), no date provided.
Food Chemistry Second Edition, Revised and Expanded; Owen R. Fennema (Exhibit G for B103), no date provided.
New Protein Foods, vol. 5, "Seed Storage Proteins", Aaron M. Altschul, et al.; (Exhibit H for B103), no date provided.
Amendment and Request for Reconsideration under 37 C.F.R. for U.S. Appl. No. 07/891,929 filed Jun. 1, 1992 (Exhibit I for B103).
Declaration of Dr. Charles W. Kolar under 37 C.F.R. 1.13 for U.S. Appl. No. 07/641,131 (Exhibit J for B103), no date provided.
Protein Technologies International, pp. 610 etc. Isolated Soy Protein Product Description (Exhibit K for B103), no date provided.
Missouri Secretary of State, Robin Carnahan, Business Entity Search (Exhibit L for B103), no date provided.
Responsive Expert Report of Ann H. Grev, Dec. 22, 2006.
Rely Expert Report of Ann H. Grev, Jan. 23, 2007.
Expert Opinion of Professor Gregory R. Ziegler, Ph.D., Aug. 28, 2006 (With Exhibits 1-13 listed separately below).
Curriculum Vitae Gregory R. Ziegler (Exhibit 1 to B118), no date provided.
Documentation consulted (Exhibit 2 to B118), no date provided.
Individual Protein Components Listings (Exhibit 3 to B118), no date provided.
Comparison of Nellson Products with Claims 1 and 6 of the 886 patent and claim 1 of the 929 patent (Exhibit 4 to B118), no date provided.
Commercial nutritional bars obtained at Eckerd Drug on Aug. 9, 2006 (Exhibit 5 to B118.
Flow diagram for the manufacture of Confectionery bars by an extrusion process. (Exhibit 6 to B118), no date provided.
Farinograph Method of Hoffman, et al. (Exhibit & to B118), no date provided.
Water Hydration Capacity of Protein Materials (Exhibit 8 to B118), no date provided.

Ingredient Listing, Jun. 13, 2006 (Exhibit 9 to B118), no date provided.
Certificate of Analysis, Microbac Laboratories, Inc., Aug. 18, 2006 (Exhibit 10 to B118).
Commercial Product Comparison (Exhibit 11 to B118), no date provided.
Different Protein blends for Chewy Chocolate Chip found in 95 file 95-08—866 (Exhibit 12 to B118), no date provided.
Analysis of Nellson Products-Nutritional Facts Panel (Exhibit 13 to B118), no date provided.
Zeigler's Rebuttal to Expert Opinion of Wayne R. Moore, Ph.D., Ms. Ann H. Grev, dated Aug. 25, 2006; Rebuttal to Certain Technical Points of Expert Opinion of Paul H. Taylor, ASA, dated Aug. 25, 2006, Supplemental to my Expert Opinion dated Aug. 28, 2006. (With Exhibits 1-3, listed separately below).
Certificate of Analysis, Microbac Laboratories, Inc. Oct. 11, 2006 (Exhibit 1 to B133).
Protein-to-Carbohydrate Ratio (Exhibit 2 to B133), no date provided.
Commercial Product Comparison (Exhibit 3 to B133), no date provided.
Reply to Rebuttal of Wayne R. Moore, Ph.D. and Ms. Ann H. Grev, dated Dec. 22, 2006, Jan. 22, 2007 (With Exhibits 1-5 listed Separately).
Protein Functionality in Food Systems, Navam S. Hettiarachchy et al., Department of Food Services (Exhibit 1 to B137), no date provided.
Basic Statistics-Tools for Continuous Improvement, Third Edition Mark J. Kiemele, et al. (Exhibit 2 to B137), no date provided.
Principles and Procedures of Statistics, A Biometrical Approach, Robert G.D. Steel, et al., (Exhibit 3 to B137), no date provided.
Picture of Label (Exhibit 4 to B137), no date provided.
Commercial Product Comparison (Exhibit 5 to B137), no date provided.
Expert Report by Paul H. Taylor, ASA, Jan. 16, 2004, *Bariatrix Products International, Inc.* v. *Elan Nutrition, LLC*.
Expert Report by Paul H. Taylor, ASA Updated, Aug. 25, 2006, *Nellson Northern Operating, Inc.* v. *Elan Nutrition, LLC & Elan Nutrition, Inc.* (with Appendices A, B and C).
Expert Rebuttal Report by Paul H. Taylor, ASA, Oct. 6, 2006, *Nellson Northern Operating, Inc.* v. *Elan Nutrition, LLC & Elan Nutrition Inc.*
Expert Reply Report by Paul H. Taylor, ASA, Jan. 23, 2007, *Nellson Northern Operating, Inc.* v. *Elan Nutrition, LLC & Elan Nutrition Inc.* (with Appendix A).
Rule 26(a) Regarding Damages of Philip Green, C.V. No. 2:02-cv-304, *Nellson Northern Operating, Inc.* v. *Elan Nutrition, LLC & Elan Nutrition Inc.* (with Exhibits A, B, D, E, F, G, H, I, J and K), no date provided.
Reply Report of Philip Green regarding damages dated Jan. 23, 2007 C.V. No. 2:02-cv-304, *Nellson Northern Operating, Inc.* v. *Elan Nutrition, LLC & Elan Nutrition Inc.* (with Exhibit A).
Copy of Deposition of Gregory R. Ziegler, Ph.D., Jun. 19, 2007, *Nellson Northern Operating, Inc.* vs. *Elan Nutrition, LLC. & Elan Nutrition, Inc.*, Case No. 5:02-cv-0304 WKS.
Notice of Deposition of Scott Sturgill, *Nellson Northern Operating, Inc.* vs. *Elan Nutrition, LLC. & Elan Nutrition, Inc.*, Case No. 2:02-cv-0304 (With Exhibits 1-16 listed separately below), no date provided.
Deposition of Scott Sturgill on Jul. 27, 2006, *Nellson Northern Operating, Inc.* vs. *Elan Nutrition, LLC. & Elan Nutrition, Inc.*, Case No. 5:02-cv-0304.
Picture of Label MET-Rx Protein Plus Protein Bar (Exhibit 1 to B151), no date provided.
Picture of Label Lean Body Hi-Protein Meal Replacement Bar (Exhibit 2 to B151), no date provided.
Picture of Label Switch ON Triple Chocolate Crunch (Exhibit 3 to B151), no date provided.
Picture of Label KINETIX Chocolate Peanut Crisp (Exhibit 4 to B151), no date provided.
Bariatrix Redefining Nutrition (Exhibit 5 to B151), no date provided.
Bariatrix-The Tastemakers of Protein Supplements (Exhibit 6 to B151), no date provided.

"Building A Growth Strategy for the Future", Nellson Nutraceuticals Memorandum (Exhibit 7 to B151), no date provided.

Ingredient Listing (Exhibit 8 to B151), no date provided.

Commercial Product Comparison (Exhibit 9 to B151), no date provided.

Commercial Product Comparison (Exhibit 10 to B151), no date provided.

Commercial Product Comparison (Exhibit 11 to B151), no date provided.

Commercial Product Comparison (Exhibit 12 to B151), no date provided.

Commerical Product Comparison (Exhibit 13 to B151), no date provided.

Commercial Product Comparison (Exhibit 14 to B151), no date provided.

Ingredient Listing (Exhibit 15 to B151), no date provided.

Ingredient Listing (Exhibit 16 to B151), no date provided.

Copy of Deposition of Dennis Jones, Ph.D., Apr. 5, 2005, *Nellson Northing Operating, Inc.* v. *Elan Nutrition, L.L.C., & Elan Nutrition, Inc.*, Case No. 1P:02-cv-304 (with Exhibits 33-38 listed separately below).

Mix Ticket for T759PCS1 VHP Chocolate (Exhibit 33 to B168), no date provided.

Feb. 3, 2004, Declaration of Dr. Dennis Jones (Exhibit 34 to B168).

Jan. 7, 1990 fax to Leslie Rose from Dennis Jones (Exhibit 35 to B168).

Jan. 2, 1990 fax to Kathie Ferrie from Dr. Dennis Jones with attached Revised Manufacturing Procedure, Bariatrix Protein Bars (Exhibit 36 to B168).

Feb. 16, 1990 fax to Rick Manus from Dr. Dennis Jones with attached prescription (Exhibit 38 to B168).

Deposition of Dennis Jones, Ph.D., Sep. 21, 2005, *Nellson Northern Operating, Inc.* v. *Elan Nutriton, L.L.C., and Elan Nutrition, Inc.*, Case No. 1:02-cv-304.

Deposition of Patricia D. Granados, Esq., Oct. 26, 2005, *Nellson Northern Operating, Inc.* v. *Elan Nutrition, L.L.C., and Elan Nutrition, Inc.*, Case No. 2:02-cv-304.

Deposition of Thomas L. Egger, Sep. 22, 2005, *Nellson Northern Operating, Inc.* v. *Elan Nutrition, L.L.C., and Elan Nutrition, Inc.*, Case No. 1:02-cv-304.

Protective Order and Stipulation of Confidentiality, Sep. 3, 2003, *Bariatrix Products International, Inc.* v. *Elan Nutrition, L.L.C.*, Case No. 1:02-cv.304.

Smith et al., "Soybeans: Chemistry and Technology", pp. 327-338, vol. 1, AVI Publishing Company, Westport Conn. (1972).

\* cited by examiner

METHOD OF PREPARING A CONFECTIONERY PRODUCT MADE OF PROTEIN AND CARBOHYDRATE MATERIALS PRESENT IN A RELATIVE WEIGHT RATIO HIGHER THAN 1

This application is a continuation of Ser. No. 10/647,466, filed Aug. 26, 2003, now abandoned, which is a divisional of Ser. No. 10/117,111, filed Apr. 8, 2002, now U.S. Pat. No. 6,749,886, which is a continuation of Ser. No. 09/920,802, filed Aug. 3, 2001, now U.S. Pat. No. 6,432,457, which is a divisional of application Ser. No. 09/639,851, filed Aug. 16, 2000, now U.S. Pat. No. 6,299,929, which is a continuation of application Ser. No. 08/246,369, filed May 19, 1994, now abandoned, which is a continuation of application Ser. No. 07/891,929 filed Jun. 1, 1992, now abandoned, which is a continuation of application Ser. No. 07/641,131 filed Jan. 15, 1991, now abandoned. The prior applications are hereby incorporated by reference, in their entirety.

BACKGROUND OF THE INVENTION

1. Field of the Invention

The present invention relates to a confectionery product having a protein to carbohydrate relative weight ratio higher than 1. In particular, the invention relates to a diet bar for use as part of a low calorie diet, especially a very low calorie diet.

2. Description of the Prior Art

Very low calorie formula diet containing the minimum daily requirements of each of the minerals, proteins and digestible carbohydrates required by man have achieved remarkable commercial success. Such diets are usually formulated as a dry powder for use when mixed with water, either to produce a savory flavor drink resembling a soup, or a sweet flavor drink resembling a milk shake. The diets are designed for use as a sole source of nutrition over a lengthy period of time and their use can lead to significant weight losses.

However, since the diet is consumed in liquid form any desire on the part of the dieter to chew what is consumed as the daily diet is frustrated unless the dieter consumes something other than the formula diet itself. On the other hand, if the dieter does consume something other than the formula diet itself out of a desire to chew something, that can negate the effect of the diet and lead to a smaller than expected weight loss, with consequent disappointment, and/or to the breaking of the diet altogether.

While some meal replacement bars for use in conjunction with very low calorie formula diets have been proposed, such bars have to date proved to be relatively unsatisfactory and generally do not meet objectives of supplying protein without an excess of carbohydrate, due to the requirements of the manufacturing technology. High protein/low carbohydrate baked or compressed products are known. However, known bars made by a confectionery process have a poor taste and provide a substitute for one or more meals in a very low calorie dietary regimen which is much less palatable than the liquid formula diet itself.

In order to produce a confectionery meal replacement bar for use in conjunction with a very low calorie formula diet it is necessary to overcome a number of interrelated problems. Firstly, the bar must contain the necessary meal replacement level of protein in the overall diet. While that may vary depending on the form of presentation of the supplement, generally a bar should contain sufficient protein to provide at least about one-fifth and preferably at least about one-third of a day's supply of protein within the confines of the particular dietary regimen chosen. That will usually mean the bar must contain at least 5 grams of protein, and typically from about 10 to about 18 grams of protein, though larger amounts of protein are not necessarily excluded.

Secondly, the bar while having a sweet taste and not exceeding the low energy content requirements of the diet, may at the same time provide a proportion of the other nutrients, say from about one-fifth to about one-third of a day's supply of, for example, carbohydrate, fat, essential fatty acids, vitamins and minerals. This is not obligatory, and will depend on the type of dietary program which is envisaged. Thus the bar may contain a sufficient proportion of minerals and vitamins to enable it to be used as a meal replacement without detracting from the mineral and/or vitamin levels supplied in the daily diet of which it is a part, in which case the marked taste of any such minerals and/or vitamins must be sufficiently masked.

Lastly, despite the previous requirements imposed, the bar must be palatable, and at the same time sufficiently low in calories so that it is compatible with a very low calorie dietary regime.

U.S. Pat. No. 4,900,566 discloses bars which partially overcome the current disadvantages of such dietary bars and can be made by conventional confectionery processes. These bars utilize for the carbohydrate component a mixture of a digestible and an indigestible carbohydrate in suitable forms, thus allowing the creation of a plastic mass that can be shaped or formed by extrusion or rolling and subsequent cutting into a bar shape or other appropriate form. This bar contains an amount of carbohydrate material which is at least equal in weight to the weight of proteinaceous material, and may be up to 10 times the weight of the proteinaceous material, whereby the desired reduction in calorie content is achieved by a greater or a lesser admixture of an indigestible, or poorly digestible non-fibrous carbohydrate; the use of a non-fibrous material in this context reduces the viscosity of the mixture and results in bars with improved organoleptic properties.

However, such a product is imposed with burdensome requirements because it must possess a minimum percentage of indigestible carbohydrate of molecular weight lower than 5000, in order to reduce the calorific content, and remain palatable.

It has now surprisingly been found that the use of certain specific proteinaceous material alone or in combination with others, provide an excellent material for producing a bar having a higher proportion of protein than carbohydrate, and that remains chewy and palatable. The use of such proteinaceous material having a dissociation between water absorption properties and other functional characteristics render them suitable for such high protein bars without any reverse effect on the palatability of the bar. Furthermore, this confectionery product containing a majority of proteins possesses very good organoleptic properties and satisfies the dieter between each meal.

The present invention also provides a bar with higher nutritional quality at the same time as lower calorific content.

Proteinaceous materials usually used for the production of previous confectionery bars having a protein: carbohydrate weight ratio lower than 1 possess associated functionality such as high water absorption and high emulsification properties. It has been surprisingly found that proteinaceous material having dissociated functionality such as low water absorption and medium to high emulsification properties are suitable for the production of a confectionery bar having a protein: carbohydrate relative weight ratio higher than 1.

OBJECTS OF THE INVENTION

It is one object of the present invention to provide a solid substitute for one or more meals in a very low calorie dietary regimen, which is at least as palatable as the various formula diet products or the conventional foods used, and which has a chewy texture.

Another object of the invention is to provide a palatable confectionery product which is sufficiently low in calories so that it is compatible with any very low calorie dietary regime.

It is a yet further object of the invention to provide a confectionery product as a bar containing a relatively high proportion of protein and having a good, chewy, yet open texture, with good organoleptic characteristics.

It is a yet further object of the invention to provide a confectionery bar which can be used as a vehicle for other special ingredients of a dietary, nutritional or pharmaceutical nature, without imposing an undue burden in terms of calorie content which might impede the use of the bar for such purposes.

In accordance with the foregoing objects, it has surprisingly been found that certain proteinaceous materials alone or in combination with mixtures of digestible and/or optionally indigestible, or poorly digestible carbohydrates, can be used for the manufacture of such a confectionery product in the form of a bar having a highly acceptable texture, and in which the amount of protein exceeds the total amount of carbohydrate.

Such products can provide the chewy texture required by the dieter, and are otherwise organoleptically acceptable, providing the necessary level of proteinaceous material without an excessive intake of carbohydrate. The formulations in accordance with the invention also surprisingly aid in masking the taste of any minerals and/or trace elements which are optionally present.

SUMMARY OF THE INVENTION

Accordingly, the present invention provides a smooth and chewy confectionery bar comprising:
 proteinaceous material having low water absorption properties and medium to high emulsification properties;
 carbohydrate material selected from the group consisting of: digestible carbohydrate, poorly digestible carbohydrate, indigestible carbohydrate, and mixtures thereof, wherein the proteinaceous material and the carbohydrate material are present in a relative weight ratio of from about 1:0 to about 1:0.999.

Generally, the proteinaceous material used for the present invention comprise a mixture of "binding" proteins and "filler" proteins but some of them may also be used alone. The requirement for such a mixture is that whatever protein or blend of proteins is used, it should have low water absorption yet still be capable of binding the ingredients to give a plastic extrudable mass. In practice, this translates to a dissociation between water absorption and the other functional properties of the proteinaceous material or protein blend. The important factors are thus:
1) Low water absorption;
2) Emulsification properties better than would be expected from the low water absorption, thus medium to high;
3) Viscosity not as important, but low to medium preferred.

The "binding" protein is selected from the group consisting of: soy protein isolates, whey protein, whole milk protein, pea protein, egg albumen, and wheat gluten.

Each binding protein used herein should possess the following dissociated functionality: Low water absorption, and medium to high emulsification properties.

The "filler" protein is selected from the group consisting of: calcium caseinates, soy proteins, whey protein, pea protein, wheat gluten, and egg albumen.

Properties that the filler proteins should possess are: low functionality in general, with in particular low water absorption and low viscosity.

Although in general each of these proteins may be used alone for the production of such a confectionery bar (except for the whey proteins, pea proteins, wheat gluten, and egg albumen that, when used as fillers that can not be used alone), it is preferred to use them in combination, particularly, the preferred ratios used ranges between 75:25 and 25:75 (filler to binder). The most preferred ratio is 54 parts of filler protein for 46 parts of binder.

The carbohydrate material comprised in such a bar may optionally comprise indigestible carbohydrate or poorly digestible carbohydrate having a molecular weight lower or equal to 18,000, such as, for example, polydextrose.

BRIEF DESCRIPTION OF PREFERRED EMBODIMENTS

For confectionery purposes, and as desired or convenient, manufacturers often produce and package bars in packs of two or more bars. Thus, the product is hereby defined as "a confectionery bar" whether or not one serving may consist of more than one bar.

The invention relates to confectionery bars, which may or may not be enrobed with chocolate, yoghurt, peanut, carob or other type of coating material, in which the amount of proteinaceous material exceeds the amount of carbohydrate material. The carbohydrate material may consist of digestible carbohydrates alone, or mixtures of digestible carbohydrates with poorly digestible (or non-digestible) carbohydrates, or of poorly digestible carbohydrates alone. The carbohydrate material may be added as a solid, dry material, but is generally used as a concentrated solution.

The proteinaceous materials used for the invention may be binding proteins, filler proteins, or mixtures thereof.

The binding proteins may be any protein which has low absorption properties yet will emulsify and can create a matrix on hydration. Specific examples are:
Soy proteins: PP-710*
 PP-670*
 PP-860* (no longer available commercially)
 Ardex-R*
 Ardex D-HD*
 Profam G902*
 Profam S636*
 Profam S950*
 Profam S955*
 Profam S901*
Whey proteins: Functional
Whole milk protein: Functional, e.g. Refit (DMV)*
Pea Protein: Woodstone Gold*
Egg albumen: Partially denatured
Wheat gluten: Partially devitalized Generally, the preferred properties of the binding proteins, from which a person skilled in the art should be able to identify other soy proteins that could be used are:
1) low water absorption, preferably less than 2.5 grams of water per gram protein at pH 5.5;
2) medium to high emulsification properties;
3) low to medium viscosity.

The filler proteins used for the invention may be any protein which has been denatured by processing to a low level of functional activity. Specific examples are:

Caseinates: Farbest 290*
   Farbest 270*
   Farbest 200*
   Farbest 312*
*Trademarks
Soy proteins: PP-860*
   Ardex-R*
Whey proteins: Denatured
Pea proteins: Woodstone Gold*
Wheat gluten: Devitalized
Egg albumen: Denatured In addition to the above fillers, caseinate having been heat treated before drum drying may also be used.

The preferred properties of the fillers, from which a person skilled in the art should be able to identify other fillers that could be used are:

1) low functionality in general, with in particular low water absorption and low viscosity.

Although not disclosed here, other proteins may be later found to possess the relevant properties and be suitable for the production of the present invention.

Effectively, any of the binding can be used with any of the filler proteins, but the optimal ratio will change for each combination, with the limiting values of 100% of binding protein on the one hand and, 100% filler protein on the other hand (for the caseinates and soy proteins as filler proteins only).

Thus, it is the properties of the mixture of proteinaceous material that are important. The ultimate choice depends on many factors including price, flavor and availability. For example, Alanate 312* is superior to Farbest 290* but has an obvious flavor which some people do not like. The same applies to pea protein and some of the Profam* series. As far as price is concerned, egg albumen and whey protein are 4 to 5 times as expensive as soy, and would only be used if price was not a consideration. Wheat gluten is cheap, but has low nutritional value.

The best results for our purposes we obtained with PP-710* and Farbest 290* in the ratio 54:46. However, the ratio can vary as widely as from 65:35 to 40:60.

The carbohydrate material used for the invention may be a sugar polymer such as, for example, polydextrose in a 70% solution although sorbitol and xylitol may also be used in a 70% solution. This polymer is only partially metabolized in the human body. Most of the product passes through the body unabsorbed, and the principal utilization pathway for the remainder involves metabolism by intestinal micro-organisms to form carbon dioxide and volatile fatty acids. Those acids can then be absorbed and utilized as an energy source so that in man the energy provided by polydextrose is 1 Kcal per gram. However, digestible carbohydrates may be used in the production of the present invention such as, for example, honey, glucose-fructose syrup, sucrose, cocoa butter, high-fructose corn syrup, peanut butter, nuts and mixtures thereof.

The optional coating may be a conventional coating product freely available in the trade, or may be a custom-manufactured product containing greater amounts of protein than is usual (that is, 15% or more of the weight of the coating may consist of protein.)

The present invention is produced by conventional confectionery processes as defined in the several examples following:

EXAMPLE 1

A liquid blend is prepared containing polydextrose (70% solids), honey, glucose-fructose syrup (77% solids), liquid lecithin, soya bean oil and vanilla flavor. This is maintained at 40 C-45 C.

| INGREDIENT: | PER 1000 KG: | NUTRITIONAL PROFILE | per G: |
|---|---|---|---|
| Polydextrose 70% | 453.2 kg | Protein | 0.000 |
| Honey | 216.7 kg | *Fat: | 0.154 |
| Glucose-fructose | 164.5 kg | Carbohydrate: | 0.307 |
| Soya bean oil | 87.7 kg | Polydextrose: | 0.317 |
| Lecithin, liquid | 66.0 kg | Kilocalories: | 2.860 |
| Vanilla flavor | 1.08 kg | | |
| Citric acid | 1.00 kg | | |

*Lecithin calculated at 8.0 kilocalories per gram.

A hard chocolate coating was then prepared by blending calcium caseinate into a proprietary dark chocolate coating, #453, manufactured by NEILSON*. A small amount of hydrogenated vegetable oil was also incorporated into the blend, to keep viscosity at an acceptable level. The formulation was prepared according to the prescription below:

| INGREDIENT: | PER 1000 KG: | NUTRITIONAL PROFILE | per G: |
|---|---|---|---|
| Dark coating 453 | 700.00 kg | Protein | 0.210 |
| ALANATE 312 | 200.00 kg | (*) Fat: | 0.368 |
| Coating Fat | 90.00 kg | Carbohydrate: | 0.389 |
| Lecithin, liquid | 10.00 kg | Kilocalories: | 5.539 |

(*) Lecithin calculated at 8.0 kilocalories per gram.

The main mix for each bar formulation ["CORE" mix] was prepared to specifications indicated below. The ingredients were thoroughly mixed in a single-shaft ribbon blender (10 minutes), after which half the liquid mix was blended in, followed by the flavors, and the whole mixed for a further 5 minutes. The remaining amount of warm liquid mix was then added, followed by the water, and the entire mixture further blended to a homogenous plastic mass. It was then extruded through a Wemer-Lehara* 16" low-temperature former, and the resultant ribbon was cut into oblong bars of weights specified. Coating (as specified) was then applied to each bar at about 45 C. Coated bars were cooled, individually sealed into Mylar* wrappers, and packed in boxes.

| HONEY-PEANUT BAR:<br>Ingredient: | Weight per<br>mix in kg: | Weight per<br>mix in lbs: |
|---|---|---|
| Soy Protein PP 710* | 95.45 | 210.00 |
| FARBEST 290* | 79.54 | 175.00 |
| Peanut flour(*) | 11.82 | 26.00 |
| Peanut flavor | 1.36 | 3.00 |
| Buttery caramel | 2.72 | 6.00 |
| Liquid mix | 186.82 | 411.00 |
| Water | 10.45 | 23.00 |
| TOTAL BATCH WEIGHT: | +/−387.16 | +/−854.00 |
| Coating | +/−68.00 | +/−150.00 |

(*) Partially defatted; toasted.
CORE WEIGHT: 32.5 g, range 32.0-33.5 g
FINISHED BAR: 38.3 g +/− 3%

Finished bars contained 15 grams protein and 12.7 grams carbohydrate, of which 7.5 grams was fully available and 4.7 grams was the poorly digestible polydextrose.

EXAMPLE 2

An uncoated bar was prepared following the mixing and extrusion procedures given in Example 1, except that the bar was not enrobed with a coating. Bars were extruded at a weight of 37.5 grams, giving bars containing 15 grams of protein and 11.4 grams of carbohydrate, of which 5.7 grams was fully available and 5.7 grams was the poorly digestible polydextrose.

EXAMPLE 3

The bar of Example 2 was coated with 6 grams of an enrobing mixture prepared from 55 grams powdered sugar ("Icing Sugar"), 20 grams calcium caseinate (Farbest 200*) and 25 grams water, giving a bar of 43.5 grams weight with 16.1 grams protein and 14.7 grams carbohydrate, of which 5.7 grams was the poorly digestible polydextrose.

EXAMPLE 4

A coated bar was prepared following the mixing and extrusion procedures given in Example 1, except that the core of the bar was prepared to the following formulation:

| CHOCOLATE-ORANGE BAR Ingredient: | Weight per mix in kg: | Weight per mix in lbs: |
|---|---|---|
| Soy Protein PP 710* | 95.45 | 210.00 |
| FARBEST 290* | 79.54 | 175.00 |
| Cocoa powder | 11.82 | 26.00 |
| Chocolate flavor | 2.27 | 5.00 |
| Orange oil | 0.68 | 1.50 |
| Solution | 186.82 | 411.00 |
| Water (up to) | 10.45 | 23.00 |
| TOTAL BATCH WEIGHT | +/−387.03 | +/−851.50 |
| Coating | +/−68.22 | +/−150.00 |

CORE WEIGHT: 33.0 g, range 32.0-34.0 g
FINISHED BAR: 38.9 g +/− 3%

Finished bars contained 15 grams protein and 12.7 grams carbohydrate, of which 7.5 grams was fully available and 4.7 grams was the poorly digestible polydextrose.

EXAMPLE 5

An uncoated bar was prepared following the mixing and extrusion procedures given in Example 1 but using the formulation given in Example 4. Bars were extruded at a weight of 38 grams, giving bars containing 15 grams of protein and 11.4 grams of carbohydrate, of which 5.7 grams was fully available and 5.7 grams was the poorly digestible polydextrose.

EXAMPLE 6

The bar of Example 5 was coated with 7 grams of an enrobing mixture prepared from 55 grams powdered sugar ("Icing Sugar"), 20 grams calcium caseinate (Farbest 200*) and 25 grams water, giving a bar of 44 grams weight with 16.3 grams protein and 15.2 grams carbohydrate, of which 5.7 grams was the poorly digestible polydextrose.

EXAMPLE 7

The formulation of Example 1 was mixed in a double-shaft ribbon blender and extruded through a Werner-Lehara* 32" extruder equipped with a wire cut attachment. Large dies of cross-section 1½"×2½" were used, and slices corresponding to a weight of 32.5 grams were cut off parallel to the die face. These slices were then enrobed in dark high protein chocolate compound coating made from sucrose, hydrogenated vegetable oil, calcium caseinate, cocoa powder, lecithin, flavor, emulsifiers and stabilizers, containing 21% protein, 36% fat and 40% carbohydrate.

Finished bars were nutritionally identical with those of Example 1, containing 15 grams protein and 12.7 grams carbohydrate, of which 7.5 grams was fully available and 4.7 grams was the poorly digestible polydextrose.

EXAMPLE 8

A formulation identical to that of Example 4 was mixed in the fashion described in Example 7, extruded in a 32" Werner-Lehara* extruder with wire-cut attachment, and enrobed with the coating described in Example 7.

Finished bars were nutritionally identical with those of Example 4, contains 15 grams protein and 12.7 grams carbohydrate, of which 7.5 grams was fully available and 4.7 grams was the poorly digestible polydextrose.

EXAMPLE 9

A blend of 54 parts by weight soy protein isolate (PP-710*, Protein Technologies International) and 46 parts by weight calcium caseinate (Farbest 290*, Farbest Brands Inc.) was prepared in a ribbon blender and labelled Protein Blend "A".

Dry ingredients corresponding to the mix prescriptions given below were placed in the bowl of an Artofex* dough mixer and mixed gently until completely homogenous (5 minutes). Aqueous liquids (high fructose corn syrup, honey, polydextrose etcetera) were then added, mixed in (2 minutes) and followed by the oil and lecithin. After further gentle mixing, flavors were added, the whole mixed for a further 2 or 3 minutes, and the resultant mix tested for consistency. When satisfactory, it was extruded through a Werner-Lehara* 16" continuous roll extruder equipped with a 1.25"×0.5" die, 8 across. The resultant ribbons were cut with a pneumatic knife to an appropriate length for the indicated weight, and subsequently enrobed in a high protein coating of the composition indicated in Example 7.

| HONEY-PEANUT BAR Ingredient: | Weight per mix in kg: | Weight per mix in lbs: |
|---|---|---|
| Protein Blend "A" | 29.54 | 65.13 |
| Polydextrose 70% | 15.61 | 34.42 |
| Honey | 7.65 | 16.87 |
| High fructose syrup | 6.89 | 15.19 |
| Soya oil | 2.11 | 4.65 |
| Lecithin | 2.11 | 4.65 |
| Peanut butter | 2.04 | 4.50 |
| Water up to | 1.36 | 3.00 |
| Flavors | 1.15 | 2.54 |
| Glycerol | 0.45 | 1.00 |
| Potassium sorbate | 0.07 | 0.15 |
| Citric acid | 0.03 | 0.07 |
| TOTAL BATCH WEIGHT | +/−69.01 | +/−152.14 |
| Coating (Example 7) | +/−12.18 | +/−26.85 |

CORE WEIGHT: 35.0 g, range 34.5-35.5 g
FINISHED BAR: 41.0 g +/− 3%

The nutritional analysis of the bars was calculated by the Atwater method, based on the reconciliation below:

| Constituent: | Weight: | Factor: | Kilocalories: |
|---|---|---|---|
| Protein, casein: | 7.46 | @ 4.27 | 31.85 |
| Protein, soy: | 7.13 | @ 3.47 | 24.74 |
| Protein, peanut | 0.28 | @ 3.47 | 0.97 |
| Protein, cocoa: | 0.13 | @ 1.83 | 0.24 |
| Fat, PKO: | 2.10 | @ 8.84 | 18.56 |
| Lecithin: | 1.13 | @ 7.00 | 7.91 |
| Soya oil: | 1.07 | @ 8.84 | 9.46 |
| Peanut oil: | 0.50 | @ 8.37 | 4.19 |
| Fat, cocoa | 0.06 | @ 8.37 | 0.50 |
| Fructose: | 2.96 | @ 3.68 | 10.89 |
| Glucose: | 2.43 | @ 3.68 | 8.94 |
| Sucrose/others: | 2.40 | @ 3.87 | 9.29 |
| CHO, peanut: | 0.09 | @ 4.07 | 0.37 |
| CHO, cocoa: | 0.07 | @ 1.33 | 0.09 |
| Polydextrose: | 5.80 | @ 1.00 | 5.80 (+fibre) |
| | | | 133.80 |

The weights of protein and carbohydrate were calculated:

| Protein, casein: | 7.46 | Fructose: | 2.96 |
|---|---|---|---|
| Protein, soy: | 7.13 | Glucose: | 2.43 |
| Protein, peanut: | 0.28 | Sucrose/others: | 2.40 |
| Protein, cocoa: | 0.13 | CHO, peanut: | 0.09 |
| | | CHO, cocoa: | 0.07 |
| | | Polydextrose: | 5.55 |
| | 15.00 | | 13.50 |

The bars that contained 15.00 grams of protein and 13.50 grams total carbohydrate, of which 5.55 grams was the poorly digestible carbohydrate, polydextrose.

The overall nutritional profile of the bars was:

| HONEY-PEANUT BAR Ingredient: | Weight per bar (g): | Protein | Fat per bar | CHO | Fibre |
|---|---|---|---|---|---|
| Calcium caseinate | 8.285 | 7.46 | — | — | — |
| Soy Protein Isolate | 8.098 | 7.13 | — | — | — |
| Polydextrose, 70% | 7.925 | — | — | — | 5.55 |
| Honey | 3.884 | — | — | 3.09 | — |
| Glucose-fructose 77% | 3.498 | — | — | 2.69 | — |
| Hydrogenated PKO | 2.098 | — | 2.10 | — | — |
| Sucrose | 2.014 | — | — | 2.01 | — |
| Lecithin | 1.133 | — | 1.07 | — | — |
| Soya oil | 1.01 | — | 1.07 | — | — |
| Peanut butter | 1.036 | 0.28 | 0.50 | 0.09 | 0.07 |
| Water | 0.690 | — | — | — | — |
| Cocoa powder | 0.555 | 0.13 | 0.06 | 0.07 | 0.18 |
| Flavors | 0.615 | — | — | — | — |
| Glycerol | 0.228 | — | — | — | — |
| Potassium sorbate** | 0.041 | — | — | — | — |
| Citric acid | 0.015 | — | — | — | — |
| Mono/diglycerides | 0.012 | — | 0.01 | — | — |
| Sorbitan monost'e | 0.006 | — | — | — | — |
| Polysorbate 60 | 0.006 | — | — | — | — |
| Nutritional analysis | 41.210 | 15.00 | 4.81 | 7.95 | 5.80 |
| PER 100 GRAMS: | | 36.40 | 11.67 | 19.29 | 14.07 |

EXAMPLE 10

The procedures of Example 9 were followed except that the formulation mixed, extruded and enrobed with a white high protein yoghurt coating made from sucrose, hydrogenated vegetable oil, calcium caseinate, whey and yoghurt powders, lecithin and flavor, containing 21% protein, 36% fat and 40% carbohydrate.

| Constituent: | Weight: | Factor: | Kcal: |
|---|---|---|---|
| Protein, casein: | 7.46 | @4.27 | 31.85 |
| Protein, soy: | 7.13 | @3.47 | 24.74 |
| Protein, cocoa: | 0.29 | @1.83 | 0.53 |
| Fat, PKO: | 2.10 | @8.84 | 18.56 |
| Lecithin: | 1.13 | @7.00 | 7.91 |
| Soya oil: | 1.07 | @8.84 | 9.46 |
| Fat, cocoa: | 0.26 | @8.37 | 2.18 |
| Fat, butter: | 0.22 | @8.79 | 1.93 |
| Fructose: | 2.99 | @3.68 | 11.00 |
| Sucrose/other | 2.40 | @3.87 | 9.29 |
| Glucose: | 2.45 | @3.68 | 9.02 |
| CHO, cocoa: | 0.16 | @1.33 | 0.21 |
| Polydextrose: | 6.00 | @1.00 | 6.00 (+fibre) |
| | | | 136.28 |

The weights of protein and carbohydrate were calculated:

| Protein, casein: | 7.46 | Fructose: | 2.99 |
|---|---|---|---|
| Protein, soy: | 7.13 | Sucrose/others: | 2.40 |
| Protein, cocoa: | 0.29 | Glucose: | 2.45 |
| | | CHO, cocoa: | 0.16 |
| | | Polydextrose: | 5.55 |
| | 14.88 | | 13.55 |

The bars thus contained 14.88 grams of protein and 13.55 grams total carbohydrate, of which 5.55 grams was the poorly digestible carbohydrate, polydextrose.

The overall nutritional profile of the bars was:

| CHOCOLATE-ORANGE BAR Ingredient: | Weight per bar (g): | Protein | Fat per bar | CHO | Fibre |
|---|---|---|---|---|---|
| Calcium caseinate | 8.28 | 7.46 | — | — | — |
| Soy Protein Isolate | 8.098 | 7.13 | — | — | — |
| Polydextrose 70% | 7.925 | — | — | — | 5.55 |
| Honey | 3.884 | — | — | 3.09 | — |
| Glucose-fructose 77% | 3.569 | — | — | 2.74 | — |
| Hydrogenated PKO | 2.098 | — | 2.10 | — | — |
| Sucrose | 2.014 | — | — | 2.01 | — |
| Cocoa power | 1.380 | 0.29 | 0.26 | 0.16 | 0.45 |
| Lecithin | 1.133 | — | 1.07 | — | — |
| Soya Oil | 1.071 | — | 1.07 | — | — |
| Water | 0.690 | — | — | — | — |
| Flavors | 0.575 | — | — | — | — |
| Butter | 0.268 | — | 0.22 | — | — |
| Glycerol | 0.228 | — | — | — | — |
| Potassium sorbate | 0.041 | — | — | — | — |
| Citric acid | 0.015 | — | — | — | — |
| Mono/diglycerides | 0.012 | — | 0.01 | — | — |
| Sorbitan monst'e | 0.006 | — | — | — | — |
| Polysorbate 60 | 0.006 | — | — | — | — |
| Nutritional analysis | 41.298 | 14.88 | 4.73 | 8.00 | 6.00 |
| R 100 GRAMS: | | 36.03 | 11.45 | 19.37 | 14.53 |

EXAMPLE 11

The procedures of Example 9 were followed except that the formulation mixed, extruded and enrobed had the composition shown below, and a white, yoghurt-based coating was used for the enrobing of the bars.

| HONEY-ALMOND BAR | Weight per mix: | |
|---|---|---|
| Ingredient: | kgs | lbs |
| Protein Blend "A" | 30.75 | 67.80 |
| Honey | 16.07 | 35.43 |
| Polydextrose 70% | 15.50 | 34.17 |
| Almond butter | 3.09 | 6.82 |
| Lecithin | 2.20 | 4.84 |
| Water up to | 1.25 | 2.75 |
| Glycerol | 0.45 | 1.00 |
| High fructose syrup | 0.45 | 1.00 |
| Flavors | 0.95 | 2.09 |
| Potassium sorbate | 0.07 | 0.15 |
| Citric acid | 0.03 | 0.07 |
| TOTAL BATCH WEIGHT | +/−70.81 | +/−156.12 |
| Coating (see below) | +/−12.50 | +/−27.56 |

CORE WEIGHT: 35.0 g, range 34.5-35.5 g
FINISHED BAR: 41.0 g +/− 3%

The bar was coated with a white high protein yoghurt coating made from sucrose, hydrogenated vegetable oil, calcium caseinate, whey and yoghurt powders, lecithin and flavor, containing 21% protein, 36% fat and 40% carbohydrate.

The Caloric value of the bar was calculated using the Atwater method.

| CALORIC VALUE, HONEY-ALMOND BAR (using Atwater factors) | | | |
|---|---|---|---|
| Constituent: | Weight: | Factor: | Kcal: |
| Protein, casein: | 7.47 | @4.27 | 31.90 |
| Protein, soy: | 7.23 | @3.47 | 25.09 |
| Protein, almond: | 0.27 | @3.47 | 0.94 |
| Protein, whey: | 0.07 | @4.27 | 0.30 |
| Protein, yoghurt: | 0.05 | @4.27 | 0.21 |
| Total Calories from Protein: | | | 58.44 |
| Fat, PKO: | 2.10 | @8.84 | 18.56 |
| Lecithin: | 1.18 | @7.00 | 8.26 |
| Almond oil: | 0.82 | @8.37 | 6.86 |
| Sucrose/others: | 3.36 | @3.87 | 13.00 |
| Fructose: | 3.13 | @3.68 | 11.52 |
| Glucose: | 2.57 | @3.68 | 9.46 |
| CHO, whey: | 0.40 | @3.87 | 1.55 |
| CHO, almond: | 0.14 | @4.07 | 0.57 |
| CHO, yoghurt: | 0.06 | @3.87 | 0.23 |
| Polydextrose: | 5.52 | @1.00 | 5.52 (+fibre) |
| | | | 133.97 |

The weights of protein and carbohydrate were calculated:

| Protein, casein: | 7.47 | Sucrose/others: | 2.90 |
|---|---|---|---|
| Protein, soy: | 7.23 | Fructose: | 3.13 |
| Protein, almond: | 0.27 | Glucose: | 2.57 |
| Protein, whey: | 0.07 | CHO, whey: | 0.40 |
| Protein, yoghurt: | 0.05 | CHO, almond: | 0.14 |
| | | CHO, yoghurt: | 0.06 |
| | | Polydextrose: | 5.37 |
| | 15.09 | | 15.03 |

The bars thus contained 15.09 grams of protein and 15.03 grams total carbohydrate, of which 3.37 grams was the poorly digestible carbohydrate, polydextrose.

The overall nutritional profile of the bars is shown in the table which follows.

| HONEY-ALMOND flavored protein bar of 41 g: | | | | | |
|---|---|---|---|---|---|
| HONEY-ALMOND BAR Ingredient: | Weight per bar (g): | Protein | Fat per bar | CHO | Fibre |
| Calcium caseinate | 8.298 | 7.47 | — | — | — |
| Soy protein isolate | 8.216 | 7.23 | — | — | — |
| Honey | 7.951 | — | — | — | 6.33 |
| Polydextrose 70% | 7.669 | — | — | — | 5.37 |
| Hydrogenated PKO | 2.098 | — | 2.10 | — | — |
| Sucrose | 2.098 | — | — | 2.10 | — |
| Almond butter** | 1.528 | 0.27 | 0.82 | 0.14 | 0.15 |
| Lecithin | 1.181 | — | 1.09 | — | — |
| Water | 0.618 | — | — | — | — |
| Whey powder | 0.555 | 0.07 | — | 0.40 | — |
| Glucose-fructose 77% | 0.223 | — | — | 0.17 | — |
| Glycerol | 0.223 | — | — | — | — |
| Yoghurt solids | 0.123 | 0.05 | — | 0.06 | — |
| Potassium sorbate** | 0.041 | — | — | — | — |
| Sodium chloride | 0.037 | — | — | — | — |
| Color | 0.025 | — | — | — | — |
| Citric acid | 0.015 | — | — | — | — |
| Nutritional analysis | 41.399 | 15.09 | 4.01 | 9.20 | 5.52 |
| PER 100 GRAMS: | | 36.45 | 9.69 | 22.22 | 13.33 |

EXAMPLE 12

A low calorie bar of Honey-Peanut flavor was made to the formulation shown below, following the procedures described in Example 9.

| HONEY-PEANUT BAR | Weight per mix: | |
|---|---|---|
| Ingredients: | kgs | lbs |
| Protein Blend "A" | 29.54 | 65.13 |
| Polydextrose 70% | 29.30 | 64.61 |
| Lecithin | 2.50 | 4.65 |
| Peanut pieces | 2.04 | 4.50 |
| Water up to | 1.36 | 3.00 |
| Flavors | 1.15 | 2.54 |
| Honey | 1.02 | 2.25 |
| Peanut butter | 1.02 | 2.25 |
| Glycerol | 0.45 | 1.00 |
| Aspartame | 0.08 | 0.17 |
| Citric acid | 0.03 | 0.07 |
| TOTAL BATCH WEIGHT | +/−68.11 | +/−150.17 |
| Coating (Example 7) | +/−12.02 | +/−26.50 |

CORE WEIGHT: 35.0 g, range 34.5-35.5 g
FINISHED BAR: 41.0 g +/− 3%

The bars contained 15.00 grams of protein and 13.50 grams total carbohydrate, of which 10.39 grams was the poorly digestible carbohydrate, polydextrose. Energy content was calculated at 105 kilocalories per bar.

EXAMPLE 13

A low calorie bar of Honey-Peanut flavor was made to the formulation shown below, following the procedures described in Example 9.

| Honey Peanut BAR Ingredient: | Weight in kg: | Experimental Batch g/85 g | g/bar |
|---|---|---|---|
| Protein Blend "A" | 22.00 | 31.82 | 13.57 |
| Polydextrose, 70% | 28.00 | 40.50 | 17.27 |
| Cellulose | 2.20 | 3.18 | 1.36 |
| Peanut butter | 2.30 | 3.33 | 1.42 |
| Lecithin | 1.90 | 2.75 | 1.17 |
| Honey | 0.80 | 1.16 | 0.49 |
| Flavors | 1.08 | 1.56 | 0.67 |
| Glycerine | 0.34 | 0.49 | 0.21 |
| Aspartame | 0.06 | 0.09 | 0.04 |
| Potassium sorbate | 0.06 | 0.09 | 0.04 |
| Citric acid | 0.02 | 0.03 | 0.01 |
| TOTAL BATCH WEIGHT: | 58.76 | | |
| Coating (Example 7) | 10.36 | | |

CORE WEIGHT: 36.25 grams.
FINISHED BAR: 42.64 grams.

The weights of protein and carbohydrate were calculated per 100 grams of bar:

| | | | |
|---|---|---|---|
| Protein, casein: | 13.173 | Fructose: | 0.414 |
| Protein, casein: | 3.032 | Sucrose/others: | 0.549 |
| Protein, soy: | 15.464 | CHO, peanut: | 0.286 |
| Protein, peanut: | 0.866 | CHO, cocoa: | 0.145 |
| Protein, cocoa: | 0.299 | Glycerine: | 0.490 |
| | | Polydextrose: | 28.350 |
| | 32.834 | | 30.234 |

Per 100 grams, the bars thus contained 32.83 grams of protein and 30.23 grams total carbohydrate, of which 28.35 grams was the poorly digestible carbohydrate, polydextrose.

Size of bar for 14 grams protein: 42.64 grams coated.
Calorie count of a 14 gram bar: 99.45 kilocalories.

| CALORIC VALUE, HONEY-PEANUT BAR (per 100 g, using Atwater factors) | | | |
|---|---|---|---|
| Constituent: | Weight: | Factor: | Kilocalories: |
| Protein, casein: | 13.173 | @4.27 | 56.249 |
| Protein, casein | 3.032 | @4.27 | 12.947 coating |
| Protein, soy: | 15.464 | @3.47 | 53.660 |
| Protein, peanut: | 0.866 | @3.47 | 3.005 |
| Protein, cocoa: | 0.299 | @a.83 | 0.547 |
| 32.834 (grams protein) | | | |
| Total Calories from Protein: | | | 126.408 |
| Fat, PKO: | 5.100 | @8.84 | 45.084 |
| Lecithin: | 2.900 | @7.00 | 20.300 |
| Peanut oil: | 0.602 | @8.37 | 5.039 |
| Fat, cocoa: | 0.145 | @8.37 | 1.214 |
| Fructose: | 0.414 | @3.68 | 1.524 |
| Sucrose/others: | 0.549 | @3.87 | 2.125 |
| CHO, peanut: | 0.286 | @4.07 | 1.164 |
| CHO, cocoa: | 0.145 | @1.33 | 0.193 |
| Glycerine: | 0.490 | @3.75 | 1.838 |
| Polydextrose: | 28.350 | @1.00 | 28.350 (+fibre) |
| Total Calories per 100 grams: | | | 233.239 |

EXAMPLE 14

A bar of Black Forest Cake flavor was made to the formulation shown below, following the procedures described in Example 9. The bar was enrobed in the coating of Example 7.

| BLACK FOREST BAR Ingredient: | Weight in kg: |
|---|---|
| Protein Blend "A" | 29.54 |
| Polydextrose 70% | 15.62 |
| Fructose syrup 77% | 7.34 |
| Sorbitol 70% | 7.34 |
| Soya oil | 2.12 |
| Lecithin | 2.12 |
| Cocoa powder | 1.60 |
| Cherries, dried | 1.60 |
| Milk, full fat | 1.00 |
| Flavor | 1.11 |
| Cream, whipping | 0.88 |
| Glycerol | 0.46 |
| Potassium sorbate | 0.08 |
| Citric acid | 0.04 |

CORE WEIGHT: 28.0 g, range 27.5-28.5 g
FINISHED BAR: 34.0 g +/− 3%

The weights of protein and carbohydrate were calculated for a bar:

| | | | |
|---|---|---|---|
| Protein, casein: | 6.09 | Fructose: | 2.52 |
| Protein, soy: | 5.69 | Sorbitol/glycerol | 2.24 |
| Protein, cocoa: | 0.20 | Sucrose/others: | 1.84 |
| Protein, cherry: | 0.02 | CHO, cocoa: | 0.56 |
| Protein, milk: | 0.02 | Glucose: | 0.24 |
| | | CHO, milk: | 0.03 |
| | | Polydextrose: | 4.40 |
| | 12.02 | | 11.83 |

The bars thus contained 12.02 grams of protein and 11.83 grams total carbohydrate, of which 4.40 grams was the poorly digestible carbohydrate, polydextrose.

The overall nutritional profile of the bars was thus:

| Constituent: | Weight: | Factor: | Kcal: |
|---|---|---|---|
| Protein, casein: | 6.09 | @4.27 | 26.00 |
| Protein, soy: | 5.69 | @3.47 | 19.74 |
| Protein, cocoa: | 0.20 | @1.83 | 0.37 |
| Protein, cherry: | 0.02 | @3.35 | 0.07 |
| Protein, milk: | 0.02 | @4.27 | 0.09 |
| Fat, PKO: | 1.92 | @8.84 | 16.97 |
| Lecithin: | 0.90 | @7.00 | 6.30 |
| Soya oil: | 0.85 | @8.84 | 7.51 |
| Fat, cocoa: | 0.21 | @8.37 | 1.76 |
| Fat, milk: | 0.10 | @8.79 | 0.88 |
| Cherry oil: | 0.01 | @8.37 | 0.08 |
| Fructose: | 2.52 | @3.60 | 9.07 |
| Sorbitol: | 2.24 | @3.60 | 8.06 (+glycerol) |
| Sucrose/others: | 1.84 | @3.87 | 7.12 |
| CHO, cocoa: | 0.56 | @1.33 | 0.74 |
| Glucose: | 0.24 | @3.68 | 0.88 |
| CHO, milk: | 0.03 | @3.87 | 0.12 |
| Polydextrose: | 4.52 | @1.00 | 4.52 (+fibre) |
| | | | 110.28 |

| BLACK FOREST BAR Ingredient: | Weight per bar (g): | Protein | Fat | CHO | Fibre |
|---|---|---|---|---|---|
| | | | per bar | | |
| Calcium caseinate | 6.695 | 6.09 | — | — | — |
| Soy Protein Isolate | 6.410 | 5.69 | — | — | — |
| Polydextrose, 70% | 6.280 | — | — | — | 4.40 |
| Fructose syrup 77% | 2.950 | — | — | 2.27 | — |
| Sorbitol 70% | 2.950 | — | — | 2.06 | — |
| Hydrogenated PKO | 1.923 | — | 1.92 | — | — |
| Sucrose | 1.846 | — | — | 1.84 | — |
| Cocoa powder | 1.135 | 0.20 | 0.21 | 0.56 | 0.06 |
| Lecithin | 0.905 | — | 0.90 | — | — |
| Soya oil | 0.850 | — | 0.85 | — | — |
| Cherries | 0.640 | 0.02 | 0.01 | 0.49 | 0.06 |
| Flavors | 0.467 | — | — | — | — |
| Milk | 0.400 | 0.01 | 0.01 | 0.02 | — |
| Cream | 0.290 | 0.01 | 0.09 | 0.01 | — |
| Glycerol | 0.180 | — | — | 0.18 | — |
| Additives | 0.101 | — | — | — | — |
| Nutritional analysis | 34.022 | 12.02 | 4.00 | 7.43 | 4.52 |

EXAMPLE 15

A bar of Chocolate-Walnut flavor was made to the formulation shown below, following the procedures described in Example 9. The bar was enrobed in the coating of Example 7.

| CHOCOLATE-WALNUT BAR Ingredient | Weight in kg: |
|---|---|
| Protein Blend "A" | 29.54 |
| Polydextrose 70% | 15.62 |
| High fructose syrup | 14.68 |
| Soya oil | 2.12 |
| Lecithin | 2.12 |
| Cocoa powder | 1.60 |
| Ground walnuts | 1.60 |
| Milk, full fat | 1.00 |
| Flavors | 0.99 |
| Cream, whipping | 0.88 |
| Glycerol | 0.46 |
| Potassium sorbate | 0.08 |
| Citric acid | 0.04 |

CORE WEIGHT: 35.0 g, range 34.5-35.5 g
FINISHED BAR: 41.0 g +/− 3%

The bars contained 14.24 grams of protein and 13.76 grams total carbohydrate, of which 5.38 grams was the poorly digestible carbohydrate, polydextrose. Energy content was calculated at 135 kilocalories per bar.

EXAMPLE 16

A bar of Walnut-Malt flavor was made to the formulation shown below, following the procedures described in Example 9. The bar was enrobed in the coating of Example 7.

| WALNUT-MALT BAR | Weight per mix: | |
|---|---|---|
| Ingredient: | kgs | Lbs |
| Protein Blend "A" | 29.54 | 65.13 |
| Walnut pieces | 2.04 | 4.50 |
| Flavors | 1.15 | 0.60 |
| Citric acid | 0.03 | 0.07 |
| Polydextrose 70% | 15.61 | 34.42 |
| Malt syrup (80%) | 14.54 | 32.06 |
| Lecithin | 2.50 | 4.65 |
| Glycerol | 0.45 | 1.00 |
| Water up to | 1.36 | 3.00 |
| TOTAL BATCH WEIGHT | +/−68.96 | +/−152.02 |
| Coating (Example 7) | +/−12.16 | +/−26.82 |

CORE WEIGHT: 35.0 g, range 34.5-35.5 g
FINISHED BAR: 41.0 g +/− 3%

The bars contained 14.77 grams of protein and 14.28 grams total carbohydrate, of which 5.58 grams was the poorly digestible carbohydrate, polydextrose. Energy content was calculated at 140 kilocalories per bar.

EXAMPLE 17

A bar of Strawberry-Cheesecake flavor was made to the formulation shown below, following the procedures described in Example 9. The bar was enrobed in the high protein yoghurt-based coating of Example 11.

| CHEESECAKE BAR | Weight per mix: | |
|---|---|---|
| Ingredient: | kgs | lbs |
| Protein Blend "A" | 29.54 | 65.13 |
| Cheddar cheese powder | 1.02 | 2.25 |
| Dried strawberries | 1.02 | 2.25 |
| Flavors | 1.15 | 1.12 |
| Citric acid | 0.03 | 0.07 |
| Polydextrose 70% | 15.61 | 34.42 |
| Honey | 7.65 | 16.87 |
| High fructose syrup | 6.89 | 15.19 |
| Lecithin | 2.50 | 4.65 |
| Glycerol | 0.45 | 1.00 |
| Water up to | 1.36 | 3.00 |
| TOTAL BATCH WEIGHT | +/−68.96 | +/−152.02 |
| Coating (Example 11) | +/−12.16 | +/−26.82 |

CORE WEIGHT: 35.0 g, range 34.5-35.5 g
FINISHED BAR: 41.0 g +/− 3%

The bars contained 14.80 grams of protein and 14.30 grams total carbohydrate, of which 5.55 grams was the poorly digestible carbohydrate, polydextrose. Energy content was calculated at 140 kilocalories per bar.

EXAMPLE 18

A low calorie bar of Honey-Peanut flavor, fortified with vitamins and minerals to 20% of the U.S. RDA level, was made to the formulation shown below, following the procedures described in Example 9. The vitamin/mineral mix was used at a level of 0.5 grams per bar; composition of this mix is shown below. The bar was enrobed in the coating of Example 7.

| Honey Peanut Bar | Weight | Experimental batch: | |
|---|---|---|---|
| Ingredient: | in kg: | g/85 g: | g/bar |
| Protein Blend "A" | 22.00 | 31.82 | 13.57 |
| Polydextrose, 70% | 28.00 | 40.50 | 17.27 |
| Cellulose | 2.20 | 3.18 | 1.36 |
| Peanut butter | 2.30 | 3.33 | 1.42 |
| Lecithin | 1.90 | 2.75 | 1.17 |
| Vitamin/mineral mix | 0.82 | 1.18 | 0.50 |
| Honey | 0.80 | 1.16 | 0.49 |
| Flavors | 1.08 | 1.56 | 0.67 |
| Glycerine | 0.34 | 0.49 | 0.21 |
| Aspartame | 0.06 | 0.09 | 0.04 |
| Potassium sorbate | 0.06 | 0.09 | 0.04 |
| Citric acid | 0.02 | 0.03 | 0.01 |
| TOTAL BATCH WEIGHT | 59.26 | | |
| COATING (Example 7) | 10.45 | | |

CORE WEIGHT 36.75 grams
FINISHED BAR: 43.14 grams

The weights of protein and carbohydrate were calculated for the bars; they contained, per bar, 14.00 grams of protein and 12.89 grams total carbohydrate, of which 12.09 grams was the poorly digestible carbohydrate, polydextrose.

EXAMPLE 18

Vitamin and Mineral Content

| Except for calcium, phosphorus and magnesium, all vitamins and minerals are 20% of U.S. RDA. | | |
|---|---|---|
| Vitamin or mineral: | Per bar: | Comments: |
| Vitamins: | | |
| Vitamin A (i.u.) | 1000.00 | |
| Vitamin $D_3$ (i.u.) | 80.00 | |
| Vitamin E (i.u.) | 6.00 | |
| Vitamin C (mg) | 12.00 | Coated |
| Thiamin ($B_1$) (mg) | 0.30 | Coated |
| Riboflavin ($B_2$) (mg) | 0.34 | Coated |
| Niacinamide (mg) | 4.00 | |
| Vitamin ($B_6$) (mg) | 0.40 | Coated |
| Vitamin ($B_{12}$) (mcg) | 1.20 | Micrograms! |
| Folic acid (mg) | 0.08 | |
| Biotin (mg) | 0.06 | |
| D-pantothenic acid (mg) | 2.00 | |
| MINERALS: | | |
| Calcium (mg) | 50.00 | |
| Phosphorus (mg) | 30.00 | |
| Iron (mg) | 3.60 | |
| Iodine (mg) | 0.03 | |
| Magnesium (mg) | 30.00 | |
| Copper (mg) | 0.40 | |
| Zinc (mg) | 3.00 | |
| Potassium (mg) | 75.00 | |
| Manganese (mg) | 0.40 | |
| Sodium (mg) | 50.00 | |

EXAMPLE 19

A protein bar of fig and raisin flavor, fortified with vitamins and minerals to 100% of the U.S. RDA level, was made to the formulation shown below, following the procedures described in Example 9. The vitamin/mineral mix was used at a level of 2.0 grams per bar; composition of this mix is shown below. The bar was enrobed in the coating of Example 7.

| PROTEIN-RAISIN FORTIFIED BAR Ingredient | Weight in kg: |
|---|---|
| Protein Blend "A" | 26.00 |
| High fructose syrup | 15.00 |
| Raisin paste | 7.00 |
| Polydextrose 70% | 5.00 |
| Fig paste | 4.00 |
| Vitamin/mineral mix | 2.50 |
| Flavors | 1.50 |
| Peanut butter | 1.25 |
| Crisp rice | 1.25 |
| Lecithin | 1.00 |

CORE WEIGHT: 64.00 grams.
FINISHED BAR: 75.00 grams.

The weights of protein and carbohydrate were calculated for the bars; they contained, per bar, 25.80 grams of protein and 21.50 grams total carbohydrate, of which 3.50 grams was the poorly digestible carbohydrate, polydextrose.

EXAMPLE 19

Vitamin and Mineral Content

| Except for calcium, phosphorus and magnesium, all vitamins and minerals are 100% of U.S. RDA. | | |
|---|---|---|
| Vitamin or mineral: | Per bar: | Comments: |
| Vitamins: | | |
| Vitamin A (i.u.) | 5000.00 | |
| Vitamin $D_3$ (i.u.) | 400.00 | |
| Vitamin E (i.u.) | 30.00 | |
| Vitamin C (mg) | 60.00 | Coated |
| Thiamin ($B_1$) (mg) | 1.50 | Coated |
| Riboflavin ($B_2$) (mg) | 1.70 | Coated |
| Niacinamide (mg) | 20.00 | |
| Vitamin ($B_6$) (mg) | 2.00 | Coated |
| Vitamin ($B_{12}$) (mcg) | 6.00 | Micrograms! |
| Folic acid (mg) | 0.40 | |
| Biotin (mg) | 0.30 | |
| D-pantothenic acid (mg) | 10.00 | |
| MINERALS: | | |
| Calcium (mg) | 250.00+ | |
| Phosphorus (mg) | 150.00+ | |
| Iron (mg) | 18.00 | |
| Iodine (mg) | 0.15 | |
| Magnesium (mg) | 150.00 | |
| Copper (mg) | 2.00 | |
| Zinc (mg) | 15.00 | |
| Potassium (mg) | >375.00 | |
| Manganese (mg) | 2.00 | |
| Sodium (mg) | <250.00 | |

EXAMPLE 20

A blend of 50 parts of weight of a binding protein and 50 parts by weight of a filler protein was prepared in a ribbon blender and labeled "Protein blend E".

The table shows the different combinations used:

|  | Binding protein | Filler protein |
|---|---|---|
| 1) | Woodston Gold* | Farbest 270* |
| 2) | Mira-Pro 121* | Farbest 290* |
| 3) | Ardex-R* | PP-860* |
| 4) | Ardex D-HD* | Woodstone Gold* |

Dry ingredients corresponding to the combinations given below were placed in the bowl of an Artofex* dough mixer and mixed gently until completely homogenous (5 minutes). Aqueous liquids (high fructose corn syrup, honey, polydextrose, etc.) were then added, mixed in (2 minutes) and followed by the oil and lecithin. After further gentle mixing, flavors were added the whole mixed for a further 2 or 3 minutes, and the resultant mix tested for consistency. When satisfactory, it was extruded through a Wemer-Lehara* 16" continuous roll extruder equipped with a 1.25"×0.5" die, 8" across. The resultant ribbons were cut with a pneumatic knife to an appropriate length for the indicated weight, and subsequently enrobed in a high protein coating of the composition indicated in Example 7.

| HONEY-PEANUT BAR | Weight per mix: | |
|---|---|---|
| Ingredient: | kgs | lbs |
| Protein Blend "E" | 30.00 | 66.13 |
| Polydextrose 70% | 16.00 | 35.28 |
| Honey | 7.65 | 16.87 |
| High fructose syrup | 6.89 | 15.19 |
| Soya oil | 2.11 | 4.65 |
| Lecithin | 2.11 | 4.65 |
| Peanut butter | 2.04 | 4.50 |
| Water (up to) | 1.36 | 3.00 |
| Flavors | 0.45 | 1.00 |
| Potassium sorbate | 0.07 | 0.15 |
| Citric acid | 0.03 | 0.07 |
| TOTAL BATCH WEIGHT: | +/−69.86 | +/−154.00 |
| Coating (Example 7) | +/−12.18 | +/−26.85 |

CORE WEIGHT: 35.0 g, range 34.5-35.5 g
FINISHED BAR: 41.0 g +/−3%

The bars contained from 14 to 15 grams of protein and 13 to 13.80 grams total carbohydrate, of which 5.55 grams was the poorly digestible carbohydrate, polydextrose.

EXAMPLE 21

The procedure in example 21 was followed, except that the ratio of binder to filler was changed to 75:25.

|  | BINDING PROTEIN | FILLER PROTEIN |
|---|---|---|
| 1) | Woodstone Gold* | Egg albumen |
| 2) | Mira-Pro 121* | Refit |
| 3) | Arex-R* | Alanate 312* |
| 4) | Ardex D-HD* | PP-860* |

The bars contained from 14 to 15 grams of proteins and 13 to 13.80 grams total carbohydrate, of which 5.55 grams was the poorly digestible carbohydrate, polydextrose.

EXAMPLE 22

The procedure of example 21 was followed except that the protein used consisted of a single protein only:
1) Soy protein Ardex-R*
2) Pea protein Woodstone Gold*

Bars made with Ardex-R* contained 14.8 grams of protein and 13.4 grams of carbohydrate, of which about 5.5 grams was the poorly digestible polydextrose. Protein level in bars made with pea protein was about 14.6 grams, reflecting the lower purity of the material.

EXAMPLE 23

The procedure of example 20 was followed, except that the ratio of binder to filler was changed to 25:75.

|  | BINDING PROTEIN | FILLER PROTEIN |
|---|---|---|
| 1) | PP-610* | Calcium caseinate denatured by heat treatment |
| 2) | Profam S290* | PP-860* |
| 3) | Ardex-R | Woodstone Gold* |

Composition of these bars ranged from 14.5 to 15 grams protein, with 14 to 14.5 grams carbohydrate.

What is claimed is:

1. A method of preparing a confectionery bar comprising a total protein content and a total carbohydrate content, the method comprising:
   (a) mixing a protein material having a water absorption property of less than 2.5 grams of water per gram of protein at pH 5.5 and a carbohydrate material in aqueous form to form a plastic mass;
   (b) extruding said mass through a cold extrusion apparatus to form a ribbon or a slab; and
   (c) cutting said ribbon or slab to form a bar;
   wherein said confectionery bar is homogenous, sufficiently soft to permit mastication and with a chewy texture and the ratio of total protein content to total carbohydrate content is greater than one.

2. The method of claim 1, wherein said protein material comprises at least one protein-selected from the group consisting of soy protein, whole milk protein, casein, caseinate, whey protein, pea protein, wheat gluten, egg albumen and mixtures thereof.

3. The method of claim 1, wherein said carbohydrate does not include glycerol.

4. The method of claim 1, further comprising adding at least one nutritional or pharmaceutical ingredient in step (a).

* * * * *